(12) United States Patent
Tachizawa et al.

(10) Patent No.: US 7,454,781 B2
(45) Date of Patent: *Nov. 18, 2008

(54) METHOD ENABLING MULTIPLE SESSIONS AND APPLICATIONS IN INSTANT MESSAGING AND PRESENCE SERVICE

(75) Inventors: Tetsuro Tachizawa, Tampere (FI); Zoltán Ördögh, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 11/270,318

(22) Filed: Nov. 8, 2005

(65) Prior Publication Data

US 2006/0117380 A1 Jun. 1, 2006

Related U.S. Application Data

(60) Provisional application No. 60/626,327, filed on Nov. 8, 2004.

(51) Int. Cl.
H04L 9/32 (2006.01)
(52) U.S. Cl. ....................................................... 726/3
(58) Field of Classification Search ........................ None
See application file for complete search history.

(56) References Cited

U.S. PATENT DOCUMENTS

| 2002/0075304 A1 | 6/2002 | Thompson et al. .......... 345/751 |
| 2003/0028597 A1 | 2/2003 | Salmi et al. | |
| 2003/0037103 A1 | 2/2003 | Salmi et al. | |
| 2003/0065788 A1 | 4/2003 | Salomaki | |
| 2003/0101343 A1 | 5/2003 | Eaton et al. .................. 713/170 |
| 2004/0202117 A1 | 10/2004 | Wilson et al. ............... 370/310 |
| 2005/0021854 A1* | 1/2005 | Bjorkner ..................... 709/245 |
| 2005/0273512 A1* | 12/2005 | Cho ........................... 709/228 |
| 2006/0129643 A1* | 6/2006 | Nielson et al. .............. 709/206 |

FOREIGN PATENT DOCUMENTS

WO WO 03/061242 7/2003

OTHER PUBLICATIONS

M. Day, J.Rosenberg, HSugano; A moele for Presence and Instant Messaging; Feb. 2000; RFC 2778; pp. 1-17.*
"OMA IMPS Delta Requirements" Candidate Version 1.3, Nov. 18, 2004 "Open Mobile Alliance" OMA-RD_IMPSDelta-V1_3-20041118-C.
"Presence Attributes", Candidate Version 1.3—Oct. 11, 2005, "Open Mobile Alliance" OMA-TS-IMPS-PA-V1_3-20051011-C.
"IMPS Architecture", Candidate Version 1.3—Oct. 11, 2005, "Open Mobile Alliance" OMA-AD-IMPS-V1_3-20051011-C.

* cited by examiner

*Primary Examiner*—Pramila Parthasarathy
(74) *Attorney, Agent, or Firm*—Ware, Fressola, Van Der Sluys & Adolphson LLP (57) ABSTRACT

The invention relates to a method for a user to obtain services from an Instant Message and Presence Service (IMPS) server. The user is identified by a user identification (UserID). An application session is established, through an application client of the user, on the IMPS server. In order to establish the session, an identification code is established in order to be used for the session, and the session is established only if the identification code is not being used for an existing session established by the same user on the same server.

34 Claims, 5 Drawing Sheets

Fig. 1 (Prior Art)

| Presence Attribute | | | |
|---|---|---|---|
| Attribute Name | Qualifier | Authority | Value |

| Presence Attribute | | | | |
|---|---|---|---|---|
| Name | Qualifier | Value | Presence Info | ClientID |

METHOD ENABLING MULTIPLE SESSIONS AND APPLICATIONS IN INSTANT MESSAGING AND PRESENCE SERVICE

CROSS REFERENCE TO RELATED APPLICATIONS

This application claims priority to a provisional patent application Ser. No. 60/626,327 filed at the United States Patent and Trademark Office on Nov. 8, 2004.

TECHNICAL FIELD

The present invention relates generally to communication systems and, more particularly, to instant messaging and presence services in communication systems.

BACKGROUND ART

Instant messaging (IM) services provide end users means for fast, interactive, mainly text-based communication. A user of an IM service may talk to one or more other users, regardless of where they might be, at the same time. With the addition of a service that keeps track of online status and availability of partners or "friends" of a user, the functionality of the IM service is greatly enhanced. This service is called a presence service. The combination of instant messaging and presence services is called Instant Messaging and Presence Service (IMPS). One instance of IMPS is Open Mobile Alliance Instant Messaging and Presence Service (OMA IMPS). Open Mobile Alliance (OMA) defines a set of universal specifications for mobile IMPS, as well as procedures and tools for testing conformance and interoperability. The specifications are for exchanging messages and presence information between mobile devices, mobile services, and Internet-based instant messaging services.

Figure 1:
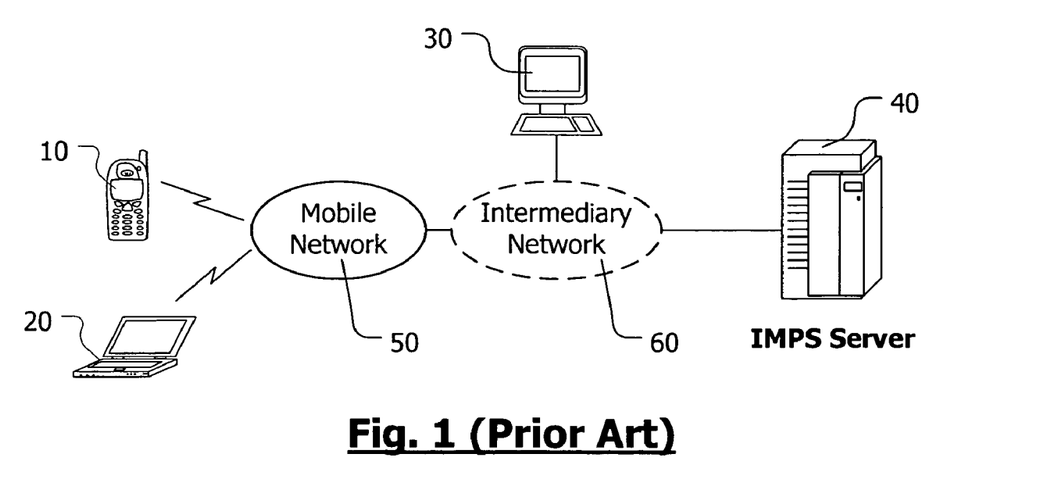
FIG. 1 is a schematic block diagram of a basic IMPS system.

FIG. 1 illustrates a basic mobile IMPS system. A number of mobile devices, such as a mobile phone 10 and a laptop computer 20, can be connected via a mobile network 50 and possibly one or more intermediary network 60 to an IMPS server 40. Typically, the Internet is used as the intermediary network. Also, non-mobile devices, such as a desktop personal computer (PC) 30, may be served by the IMPS system through the network connections as well.

Presence information of a user is organized in the form of presence attributes. A description of prior art presence attributes can be found in U.S. Patent Application Publication No. 2003/0065788, which discloses that the presence attributes are divided into several classes, and each class comprises one or more presence attributes:

Client Status: attributes describing the availability of the client for communication,
User Status: attributes describing the availability of the user for communication,
Local Information: attributes describing local environment of the user,
Personal Status: attributes describing user's personal status,
Client Capabilities: attributes describing the capabilities of the client to support different means of communication, different media types and different features,
User Attributes: attributes allowing the client device or the user to define their own textual presence values and references to external values, and
Extended Presence Information: vendor specific or service provider dynamically defined non-standard presence attributes.

Since presence information is personal, it is only made available according to a user's wishes. A user can create a contact list of other users (e.g. friends or partners), and block or grant accesses to own presence information from specific users. Contact list and block/grant list are not part of the presence information. The lists are stored on the server.

Figure 2:
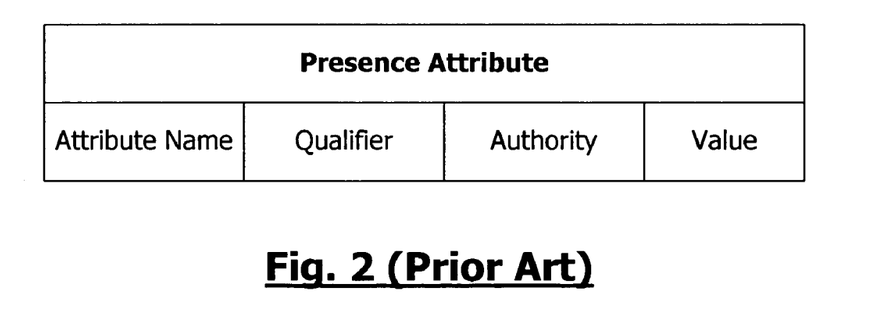
FIG. 2 is a general structure of a presence attribute according to prior art.

A presence attribute according to this prior art reference generally comprises an identifier part (Attribute Name) and a plurality of value fields (Qualifier, Authority and Value), as shown in FIG. 2.

A user device of an IMPS system includes one or more IMPS clients. A client is an implementation of the IMPS service that allows a user to access the service. The client may be hardware, software, firmware, or any combination thereof. The client is conceptually device-independent, so that a connection to an IMPS server is considered to be between a client and the server. Conventionally, a connection to the IMPS server is identified by two identities: (1) user identity (ID), comprising an user name and a possible password for authentication, and (2) client ID, comprising a client name and a client address, for identifying the particular client that is used to access the IMPS system (U.S. Patent Application Publication No. 2003/0028597, FIG. 2B). When a user accesses the IMPS system, the client needs to provide both user ID and client ID. A user device may have a plurality of users using the same client. By separating user identity and client identity, a user can get instant messages from different clients and different users using the same client can get their own instant messages.

Today's user devices are increasingly personal. One user typically uses one or more user devices, such as a mobile phone and a PDA (personal data assistant), at a time. Instances of one user device being used by two or more users at the same time may still exist, especially in non-mobile devices, but such instances are increasingly rare. An advanced user device may contain one or more clients that interact with the IMPS server for obtaining the services. From the standpoint of OMA, a user device may have one or more IMPS clients (i.e. OMA IMPS) and one or more third-party (non-OMA) application clients (3APP clients). A client may further include one or more applications such as instant messaging and interactive games.

The OMA IMPS solution allows a client to log on to a server and perform various transactions. A connection between a client and a server is called a session. Since one user may want to use more than one client at same time, it is desired that a server is capable of handling multiple sessions of the same user at same time. In order to do so, however, it is necessary to distinguish one session from another.

Existing protocols (e.g. OMA IMPS version 1.1 and 1.2) do not specifically address the issue of handling instant messages and other information that resides in the server when there is another client of the same user trying to log in. Most of the servers disconnect the previous client in order to guarantee that there is only one client of a user logged in any one time.

In order to provide the user with a smooth operation of multiple sessions, a proposed new specification, OMA IMPS Version 1.3, mandates several requirements for the server and the client. It is believed that if these requirements are fulfilled, the concurrent sessions of a user will not interfere with each other. Moreover, presence information subscriptions will be separated for each session, and joined groups will be separated for each session.

Table 1 is a list of general requirements for use of multiple applications or sessions.

TABLE 1

General Requirements for use of multiple applications/sessions

| Ref | Requirements |
|---|---|
| GEN-11 | Devices, Clients and 3APPs MAY be able to establish any number of separate sessions on any Server. |
| GEN-12 | Devices, Clients and 3APPs using separate sessions SHALL use different identification. |
| GEN-13 | Server SHALL NOT accept creating separate sessions from ClientIDs that are already in use in other sessions on a per user basis. |
| GEN-14 | Server SHALL accept creation of separate sessions from a unique ClientID that is not in use in any other session on a per user basis. |
| GEN-15 | Server SHALL NOT disconnect previous session(s) when a new session is established on a per user basis. |
| GEN-16 | Server MAY limit the number of concurrent sessions and deny establishing new sessions for this reason. |

(Source: OMA IMPS Delta Requirements, Candidate version 1.3, 18 Nov. 2004, Open Mobile Alliance OMA-RD_IMPSDelta-V1_3-20041118-C.)

What is needed is a method enabling multiple sessions and applications in instant messaging and presence service, fulfilling the general requirements of Table 1.

SUMMARY OF THE INVENTION

This invention presents a method that allows a user of an instant message and presence service (IMPS) to establish multiple application sessions using multiple clients or devices on an IMPS server.

According to a first aspect of the invention, a method is provided for a user, identified by a user identification (UserID), to establish an application session on an instant message and presence service (IMPS) server through an application client of the user. The method comprises the steps of establishing an identification code to be used for the session; and establishing the session only if the identification code is not being used for an existing session established by the same user on the same server.

According to a second aspect of the invention, an IMPS server, capable of establishing an application session through an application client for a user, identified by a user identification (UserID), is provided. The server comprises means for establishing an identification code to be used for the session, and means for establishing the session only if the identification code is not being used for an existing session established by the same user on the same server.

According to a third aspect of the invention, a device, comprising at least one client for obtaining services from an IMPS server, is provided. The device comprises means for generating an identification code for a client when the client attempts to establish an application session on the server for a user, and means for transmitting said identification code to said server.

Further according to the third aspect of the invention, the device is a wireless terminal communicatively coupled to a mobile network for accessing services provided by the IMPS server.

According to a forth aspect of the invention, an IMPS system comprising an IMPS server and a user device comprising at least one application client is provided. The device, being used by a user, comprises means for generating an identification code for a client when the client attempts to establish an application session on the server for a user, and means for transmitting said identification code to said server.

The server comprises means for establishing the identification code to be used for the session, and means for establishing the session only if the identification code is not being used for an existing session established by the same user on the same server.

According to a fifth aspect of the invention, a client program, embodied in a computer-readable medium for storage in a user device, for enabling a user to obtain services from an IMPS server, is provided. The program comprises instructions for the user device to generate an identification code when the client attempts to establish an application session on the server in response to the user's request, and instructions for transmitting said identification code to said server.

According to a sixth aspect of the invention, a computer program embodied in a computer-readable medium for storage in an IMPS server, the server being capable of establish an application session for a user through an application client of the user, is provided. The program comprises instructions for the server to establish an identification code for the session, and instructions for the server to establish the session only if the identification code is not being used for an existing session established by the same user on the same server.

BRIEF DESCRIPTION OF THE DRAWINGS

The above and other objects, features and advantages of the invention will become apparent from a consideration of the subsequent detailed description presented in connection with accompanying drawings, in which.

DETAILED DESCRIPTION OF THE INVENTION

The present invention solves some of the problems the previous IMPS specifications (e.g. OMA IMPS versions 1.1 and 1.2) failed to address, namely how to allow a user to establish multiple sessions with multiple clients and/or applications. The invention is explained in the following exemplary embodiments.

First Embodiment of the Invention

In the first embodiment of the invention, the requirements of Table 1 are fulfilled by a client creating a unique ClientID code every time the client logs into the server, and the server allows only one session per this unique ClientID. The server according to the invention has means for establishing multiple sessions, each for a unique ClientID. The server is required to maintain an already logged-in client when a new client of the same user tries to log in. The server may set a maximum number of sessions that a user can have. These sessions may be established by different clients. If the limit is reached, any new request for a session is refused.

Figure 3:
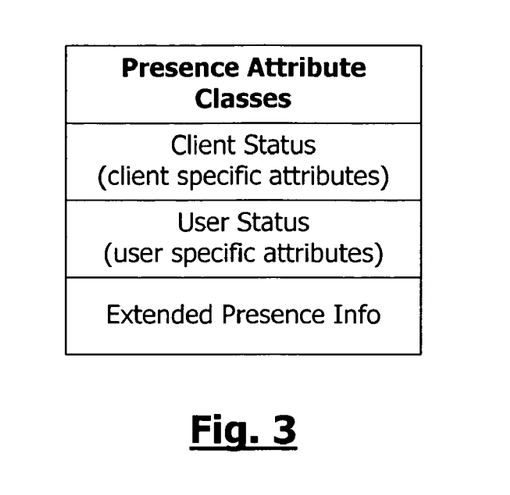
FIG. 3 is a list of presence attribute classes according to present invention.

Referring now to FIG. 3, the format of the presence attributes is redefined. Each presence attribute, except the extended presence information, is classified in one of the two categories: user-specific attributes and client-specific attributes.

User specific attributes (or user status) are presence attributes that describe the availability of the user for communication, user's personal status and other user-related information. Examples of user specific attributes include:

UserAvailability (availability of the user for communication)
PreferredContacts (contact preferences of the user)
PreferredLanguage (language preference of the user)
StatusText (user specified status text)
StatusMood (mood of the user)
Alias (alias name for the user)
StatusContent (media info for user status)
ContactInfo (phone number(s), email address, street address, etc. of the user)
InfoLink (one or more URLs to extra information)

Generally, user-specific attributes are the information related to a user. These attributes will not change if a user uses different clients to access an IMPS server.

Client-specific attributes (or client status) are related to the client the user is using for accessing the IMPS server. Generally, each client has a set of client-specific attributes that describe the status of the IMPS client, the hardware device, the availability of the client for communication, location information, capabilities of the client, and so on. Examples of client specific attributes include:

OnlineStatus (shows if the client device is logged on an IMPS server)
Registration (shows if the client device is registered in a mobile network)
ClientInfo (information about the client)
TimeZone (local time zone of the client device)
GeoLocation (geographical location of the client device)
Address (address of the client device)
CommCap (communication capabilities of the client)

Figure 4:
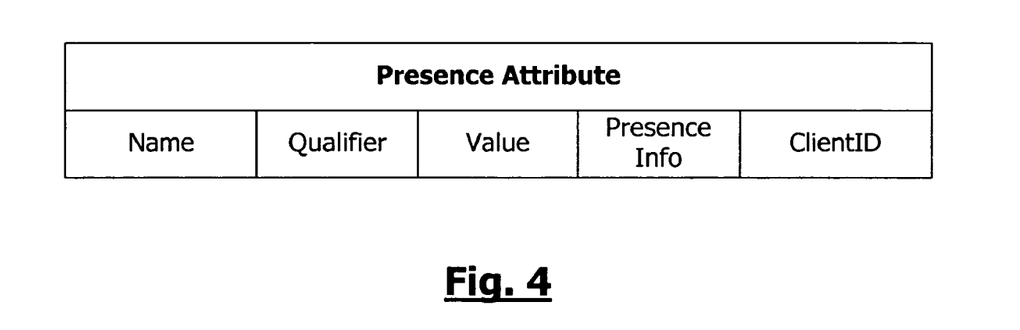
FIG. 4 is a general structure of a presence attribute according to present invention.
Figure 5:
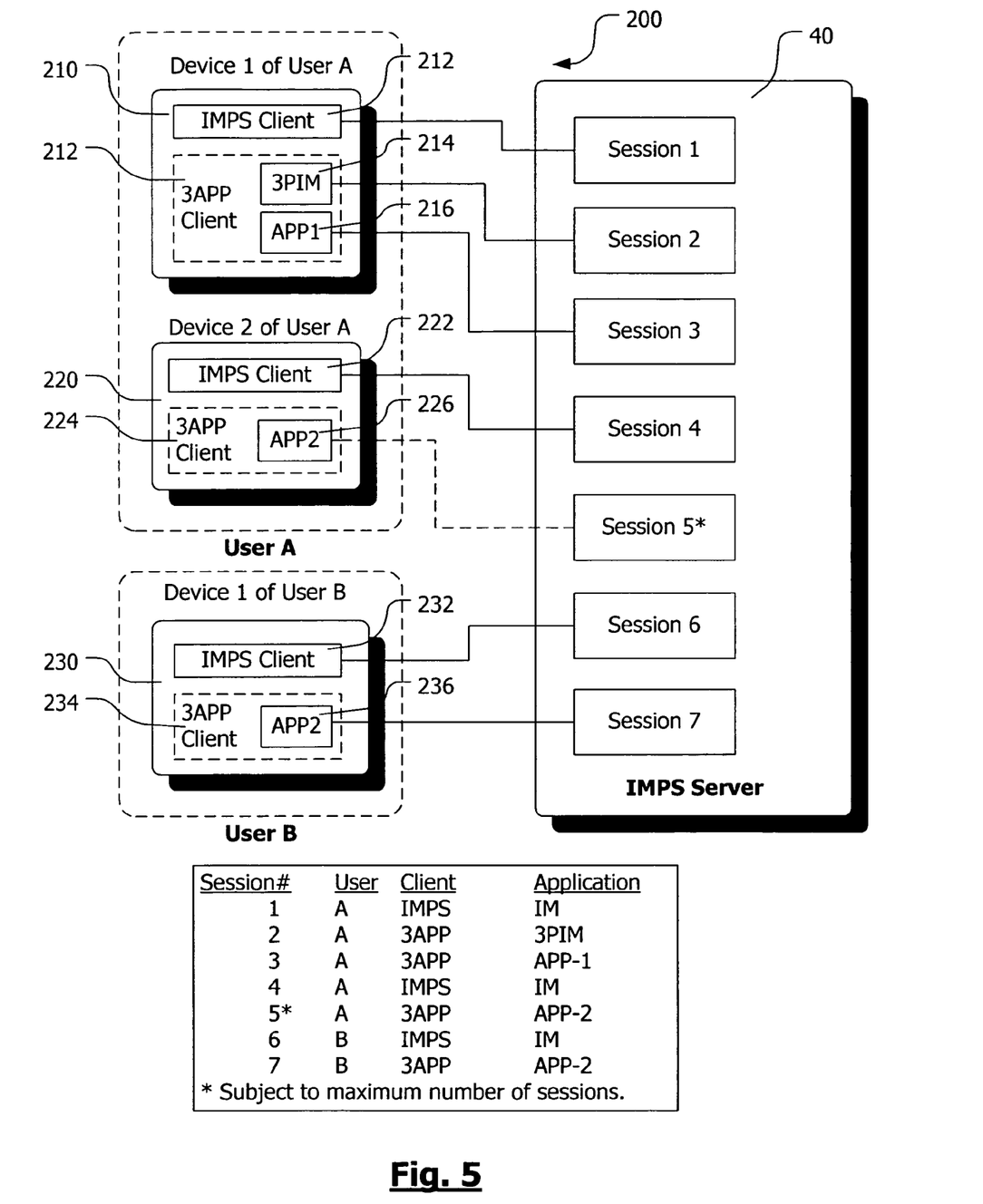
FIG. 5 is a schematic block diagram illustrating client connections to an IMPS server, according to the invention.

FIG. 4 shows a schematic general structure of a presence attribute according to the present invention. A presence attribute comprises a Name element, a Qualifier element, a Value field, a field for various structured presence information, and a ClientID element. The ClientID element indicates the client to whom the presence attribute belongs. The ClientID is a randomly generated identification code. Each time a client logs into the server, a ClientID is assigned to the client, and the client informs the server of this ClientID. If the client has an unchangeable hard-coded ClientID, the hard-coded ClientID is used instead of a randomly generated ClientID. This situation will be discussed and dealt with in the second embodiment of the invention.

Client-specific attribute carries the ClientID as a part of the presence attribute. The server publishes the user's client-specific presence attributes along with the ClientID. When a user receives a set of presence attribute of another user, the user can separate the user- and client-specific attributes. By identifying the ClientID, instant messages and other information can be forwarded to a proper client.

For detailed description of presence attributes of the present invention, see Presence Attribute, Candidate Version 1.3-11 Oct. 2005, Open Mobile Alliance, OMA-TS-IMPS-PA-V1_3-20051011-C.

Therefore, when each time a user logs into an IMPS server to establish a session, the user (identified by a UserID) establishes one set of presence attributes, each set of presence attributes belongs to a current session, identified by a unique ClientID. A user may have more than one presence attribute list assigned, so that the presence information from different clients is separated.

If a unique ClientID is used each time a client establishes a session, in theory a same client can establish unlimited number of sessions on the server, as long as each session has a unique ClientID. OMA IMPS version 1.3 specifies that a server must allow at least two concurrent sessions of same client.

Figure 6:
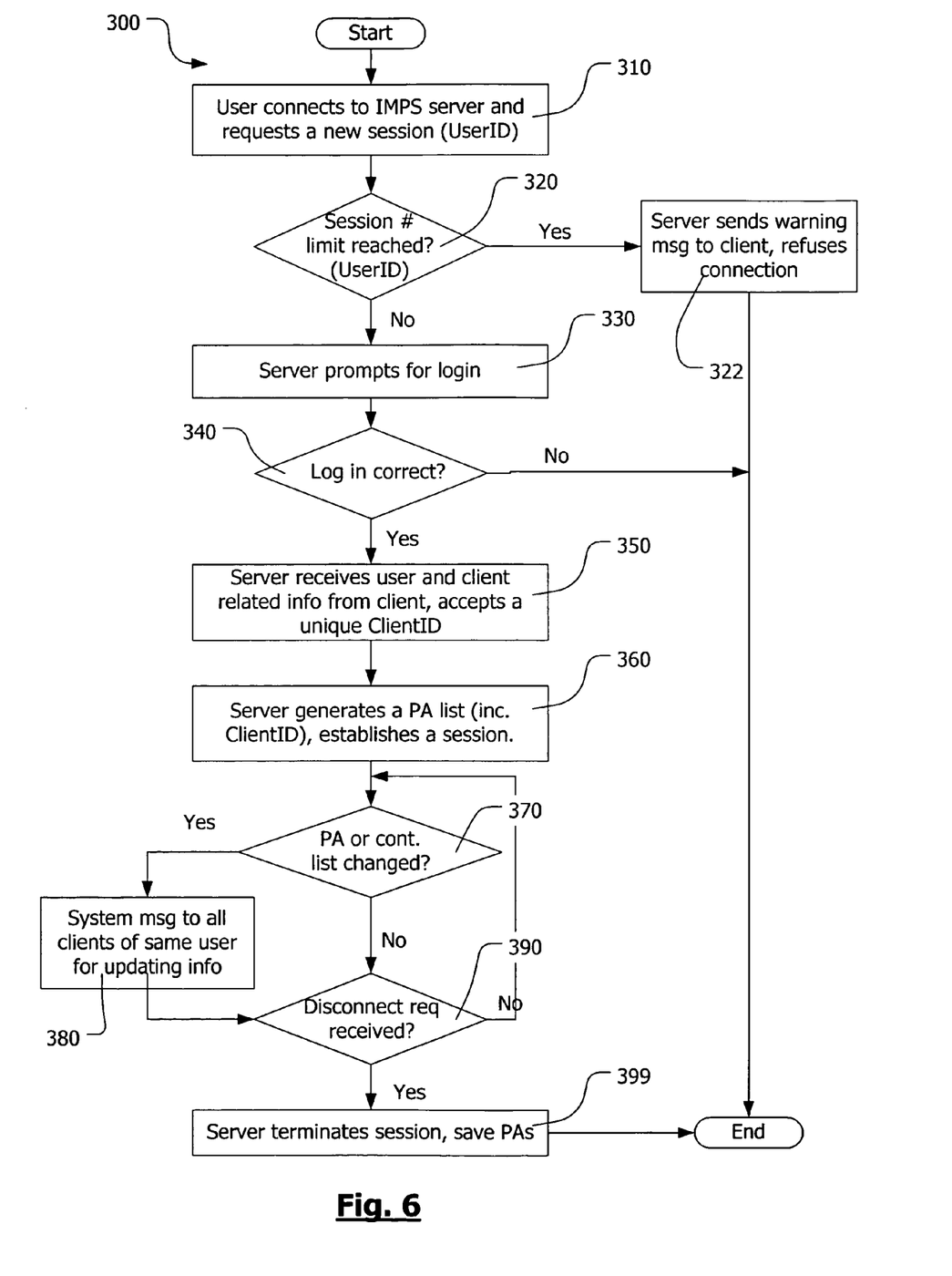
FIG. 6 is a flow diagram of a process, in which a user establishes a session on an IMPS server according to the first embodiment of the invention.

FIG. 6 shows an exemplary IMPS system 600 comprising user devices 210, 220, belonging to a user A, and user device 230, belonging to a user B. Device 210 has an OMA IMPS client 212 and a third party application (3APP) client 214. The 3APP client 214 comprises a third party instant messaging application (3PIM) 216 and another third party application (APP1) 218. The device 220 has an IMPS client 212 and a third party application (3APP) client 224 which comprises a third party application (APP2) 226. Device 230, of user B is identical to the device 220 of user A, comprising an IMPS client 232 and a third party application (3APP) client 234 which has a third party application (APP2) 236.

The fulfillment of the general requirements of Table 1 is demonstrated with reference to the exemplary case showing in FIG. 6.

GEN-11 (Device, Clients and 3APPs MAY be able to establish any number of separate sessions on any server): An IMPS server 40 has means for establish multiple sessions (Sessions 1-7), each session is associated with a unique ClientID, which is randomly generated by a client every time the client logs into the server.

GEN-12 (Device, Clients and 3APPs using separate sessions SHALL use different ID): A client can establish more than one session, as long as the client generates or provides a unique ClientID every time it logs in to the server. If this is not the case, i.e. no new ClientID is provided, the second attempt to log in will be rejected. For example, Session 3 would not be allowed if a new ClientID cannot be obtained to separate this session with Session 2.

GEN-13 (Server SHALL NOT accept creating separate sessions from ClientIDs that are already in use in other sessions on a per user basis): The server will reject a ClientID that is already been used in another session of the same user. In FIG. 6, the 3APP client in user A's device 1 has to establish two separate sessions with two unique ClientIDs for 3PIM and APP1, respectively.

GEN-14 (Server SHALL accept creation of separate session from a unique ClientID that is not in use in any other session on a per user basis): A unique ClientID can normally be obtained if the client (or device) has means for generating random ClientIDs. If the second generated ClientID happened to be the same as any of the ClientIDs that are already in use (same user), this ClientID will be rejected. The client that was rejected can see the reason from the status code received when the request was rejected. If it sees that the reason is that the ClientID is not unique, it may generate another random ClientID and try to log in again. For random code generation, the chances of having the same ClientIDs are very low.

GEN-15 (Server SHALL NOT disconnect previous session(s) when a new session is established on a per user basis): A server cannot disconnect a session in favor of another client. A termination of a session should be initialized by the client. The requirement protects the clients that are already connected from loosing their sessions in favor of another client. The server may still disconnect a session, but not in favor of connecting another client.

GEN-16 (Server MAY limit the number of concurrent sessions deny establishing new sessions for this reason on a per user basis): The total number of sessions a user can have may be specified by the server. These sessions can belong to different clients. For example in FIG. 6, if a user is allowed to have four sessions total, then the fifth session (Session 5) would not be allowed, unless one of the sessions 1-4 is terminated by the user.

A user should be able to send instant messages from one of the clients the user is currently using. The user should also be able to receive instant messages that are targeted to this client from a remote user. Preferably, an instant message intended to a user at a specific client should only be sent to this client. However, the routing information of an incoming instant message may or may not contain sufficient information identifying which client to send the instant message.

If the routing information of an instant message is available (i.e. the routing information includes a ClientID and a UserID), the message is routed to the right client by the server.

It is recommended that a client to include the routing information of the recipient (if available from the received instant message) as well as its own routing information whenever it sends or replies to an instant message. Generally, all necessary information for routing should be available after two replies.

If the routing information is not available, the server needs to deliver the message to all clients that support the instant message. After the client replies to the message and the reply includes a ClientID, the further incoming messages will be delivered to the specific client.

When the recipient client, to which the instant message should be delivered to based on the routing information, is offline, the server replies to the originator saying that the recipient is offline, and drops the instant message.

In case of group messaging, only the client/application that joined the group will receive the messages.

If a user modifies presence information or contact list (including block/grant list) on a client, other clients of the same user may be informed about the modifications. A system message is sent to all clients of the same user and the clients that are interested in the actual changes can retrieve the up-to-date information.

Examples of modifications that may be notified to other clients include:
  Contact list or its property has been updated (created, deleted, or updated),
  Block/grant list has been updated (an entry was changed, or its use flag has been switched),
  Presence authorization has been updated (attribute list updated, association updated, etc.), and
  Invitations updated (created, canceled, etc.).

A flow diagram according to this embodiment is shown in FIG. 6. A user starts using an IMPS client on a user device. At a step 310, the user attempts to log into an IMPS server and requests a new session. The user's identification (UserID) is provided to the server. At a step 320, the server determines whether this user has reached session number limit (if any). If the number limit has reached, no new session will be allowed for this user. At a step 322, the server sends a warning message to the client and refuses the connection. The user has to terminate at least one existing session in order to establish a new session. If, otherwise, the number limit has not been reached, the user is allowed to establish a new session for this client. At a step 330, the server prompts for login. At a step 340, proper authentication takes place between the user, the client, and the server. If the login is successful, at a step 350, server receives user and client related information from the client, accepts a unique ClientID. At a step 360, the server establishes a session, generates a presence attribute list that contains user and client specific attributes. During the session, the server keeps tracking presence information related to the user status, contact list and/or block/grant list, which are modifiable by the user (step 370). If any changes are made, at a step 380, the server sends a system message to all clients of the same user, informing the changes. By the general requirements, the server cannot initialize a termination of an existing session when another client tries to log in, so that a request for terminating a session has to be originated by a client and received by the server (step 390). At a step 399, if the server receives such a request, it saves presence information of the session and disconnects the client.

SECOND EMBODIMENT OF THE INVENTION

The first embodiment of the invention would be best used in the situations where a client (or a user device that hosts the client) has the capability of generating a random and unique ClientID every time it logs in to an IMPS server, and the server uses this ClientID to identify the client. Sometimes, this condition may not be met. For example, some clients may have a hard-coded "ClientID" that is preset by the device or software manufacturer.

Because of this, a second session may not be established since the server only allows a unique ClientID being used in one session. Also, if two devices are identical, the hard-coded ClientID may be the same. The second client cannot log in because the ClientID is already in uses. Thus, a user cannot use two identical clients (or devices) at the same time.

In the second embodiment of the invention, the above problem is addressed. Instead of using a ClientID to identify a session, a separate ID code, ApplicationID, is created. An IMPS server creates a unique ApplicationID every time a client logs into the server, and allows only one session per client per this unique ApplicationID. ApplicationID is an element of the presence attribute ClientInfo.

Presence attribute ClientInfo indicates to the subscriber information about this particular client (including the device that hosts the client). This information includes manufacturer, model, a user-defined name, the current language, the IM priority, the Application-ID and a description of the client. Defined information elements include:
  ClientContentLimit: Describes the content limitations of the publisher's client and the entire route of servers towards the publisher's client.
  ClientType: Describes the client/device type, such as PC, Mobile, HTML, etc.
  DevManufacturer: Name of the device manufacturer.
  ClientProducer: Name of the producer of the client.
  Model: Model of the device.
  ClientVersion: Version of the client.
  Language: Language setting of the client device.
  ClientIMPriority: EM priority of the client.
  Application-ID: The Application-ID that the client used during login.

If a client provides an ApplicationID during a login, the server must set this value.

Otherwise, a value is assign by the server for this particular session.

In instant message routing, if the routing information of an instant message is available (i.e. the routing information includes an ApplicationID, a ClientID (does not have to be unique) and a UserID), the message is routed to the right client at right session by the server.

If the routing information is not available, the server needs to deliver the message to all applications of all clients that support the instant message. After the client replies to the message and the reply includes an ApplicationID, the further incoming messages will be delivered to the specific client at the specific session.

Figure 7:
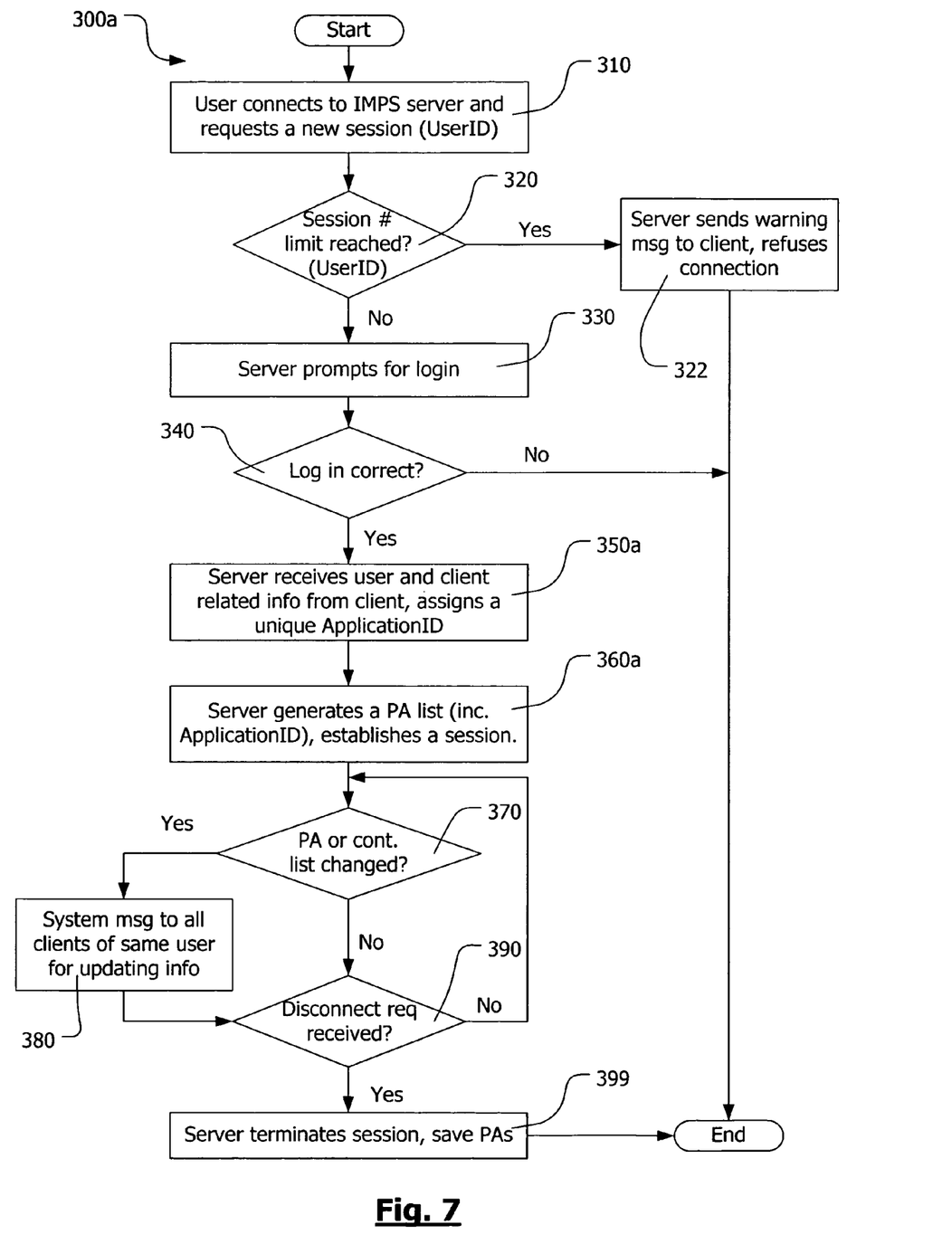
FIG. 7 is a flow diagram of a process, in which a user establishes a session on an IMPS server according to the second embodiment of the invention.

A flow diagram according to this embodiment is show in FIG. 7. A user starts using an IMPS client on a device. At a step 310, the user attempts to log into an IMPS server and requests a new session. The user's identification (UserID) is provided to the server. At a step 320, the server determines whether this user has reached session number limit (if any). If the number limit has reached, no new session will be allowed for this user. At a step 322, the server sends a warning message to the client and refuses the connection. The user has to terminate at least one existing session in order to establish a new session. If, otherwise, the number limit has not been reached, the user is allowed to establish a new session for this client. At a step 330, the server prompts for login. At a step 340, proper authentication takes place between the user, the client, and the server. If the login is successful, at a step 350*a*, the server receives user and client related information from the client, assigns a unique ApplicationID, or accepts an ApplicationID form the client (if any). At a step 360*a*, the server establishes a session, generates a presence attribute list that contains user and client specific attributes including an ApplicationID. During the session, the server keeps tracking presence information related to the user status, contact list and/or block/grant list, which are modifiable by the user (step 370). If any changes are made, at a step 380, the server sends a system message to all clients of the same user, informing the changes. By the general requirements, the server cannot initialize a termination of an existing session when another client tries to log in, so that a request for terminating a session has to be originated by a client and received by the server (step 390). At a step 399, if the server receives such a request, it saves presence information of the session and disconnects the client.

In summary, identification codes are utilized in order to allowing for a user of an instant message and presence service to establish multiple concurrent application sessions. Each session is identified by a unique identification code and instant messages and other information are deliverable to any session that is identified by the identification code. The user can establish more than one session form one client, and use multiple sessions from different clients at same time.

The present invention has been disclosed in reference to specific examples therein. Numerous modifications and alternative arrangements may be devised by those skilled in the art without departing from the scope of the present invention, and the appended claims are intended to cover such modifications and arrangements.

What is claimed is:

1. A method, comprising:
   providing an identification code to be used by a client of a user for establishing a session on an instant message and presence service server,
   transmitting the identification code to the server for establishing the session, and
   establishing the session if the identification code is not used by an existing session established by the same user on the same server.

2. The method of claim 1, wherein the identification code is generated or provided by the client, and the client is identified by the identification code for establishing the session.

3. The method of claim 2, wherein the identification code is included in presence information of the user.

4. The method of claim 3, wherein the presence information of the user comprises one or more presence attributes that are related to the client, and the identification code is included in at least one of such presence attributes as client identification.

5. The method of claim 1, wherein the identification code is an application identification code, said application identification code is generated by the server if an identification code is not provided by the client, or an identification code provided by the client is not unique for the session.

6. The method of claim 5, wherein the application identification code is included in presence information of the user.

7. The method of claim 6, wherein the presence information of the user comprises one or more presence attributes that are related to the client, and the application identification code is an element of a presence attribute related to the client.

8. The method of claim 7, wherein said presence attribute related to the client contains information about the client.

9. The method of claim 1, wherein among all sessions established by the same user on the server, at least two sessions can be established by the same client if a unique identification code is used for each session.

10. The method of claim 1, further comprising:
    refusing the session and informing the user that the session is not established, if the identification code is used by an existing session established by the same user on the same server, or if number of existing sessions established by the same user on the same server has reached a preset limit.

11. The method of claim 1, wherein the identification code for the session is included in an instant message sent by the user from the session, so that a reply to the instant message is delivered to the session, if the session is capable of sending and receiving instant messages.

12. The method of claim 1, further comprising:
    informing all or some of sessions of the user a modification in information related to the user at one of the sessions.

13. An instant message and presence service server, comprising:
    means for communicating with a client of a user, and
    means for establishing a session with the client for the user, wherein an identification code is provided for the session, and the session is established if the identification code is not used by an existing session established by the same user on the same server.

14. The server of claim 13, further comprising
    means for establishing presence information of the user comprising one or more presence attributes related to the client, and
    means for including the identification code in at least one presence attribute related to the client.

15. The server of claim 13, further comprising
    means for refusing the session and informing the user that the session is not established, if the identification code is used by an existing session of the same user on the server, or if number of existing sessions established by the same user on the server has reached a preset limit.

16. The server of claim 13, further comprising
    means for including the identification code in an instant message sent by the user from the session, so that a reply to the instant message is delivered to the session, if the session is capable of receiving instant messages.

17. The server of claim 13, further comprising
means for informing all or some of sessions of the user a modification in information related to the user at one of the sessions.

18. A device, comprising:
at least one client for obtaining services from an instant message and presence service server,
a processor for generating an identification code for a client when the client attempts to establish a session on the server for a user of the device, and
a transmitter for transmitting said identification code to said server,
wherein the session is established if the identification code is not used by an existing session established by the same user on the same server.

19. The device of claim 18, wherein said identification code is used as client identity and is used for uniquely identifying the session established by the client.

20. The device of claim 18,
wherein the processor is further configured to generate a subsequent identification code for a client when the client attempts to establish a session on the server for a user and the identification code is being used for an existing session of the same user in the server, and
the transmitter is further configured to transmit said subsequent identification code to said server.

21. The device of claim 18, wherein the device is a wireless terminal communicatively coupled to a mobile network for accessing services provided by the instant message and presence service server.

22. An instant message and presence service system comprising an instant message and presence service server and a user device comprising at least one application client, wherein the device, being used by a user, comprises:
processor for generating an identification code for a client when the client attempts to establish a session on the server for the user, and
a transmitter for transmitting said identification code to said server, the server comprises:
means for establishing the session if the identification code is not used for an existing session established by the same user on the same server.

23. The instant message and presence service system of claim 22, wherein the server further comprises:
means for establishing presence information of the user comprising one or more presence attributes related to the client, and
means for including the identification code in at least one presence attribute related to the client.

24. The instant message and presence service system of claim 22, wherein the server further comprises:
means for refusing the session and informing the user the session is not established, if the identification code is used by existing session of the same user on the server, or if number of existing sessions established by the user on the server has reached a preset limit.

25. The instant message and presence service system of claim 22, wherein the server further comprises:
means for including the identification code in an instant message sent by the user from the session, so that a reply to the instant message is delivered to the session, if the session is capable of receiving instant messages.

26. The instant message and presence service system of claim 22, wherein the server further comprises:
means for informing all or some of sessions of the user a modification in information related to the user at one of the sessions.

27. A computer program product, embodied in a computer-readable storage medium for use in a device, said program product comprises:
instructions for the device to provide an identification code when a client attempts to establish a session on an instant message and presence service server in response to a user's request, and
instructions for transmitting said identification code to said server,
wherein the session is established if the identification code is not used by an existing session established by the same user on the same server.

28. A computer program product embodied in a computer-readable storage medium for use in an instant message and presence service server, said program product comprises:
instructions for the server to communicate with a client of a user, and
instructions for the server to establish a session with the client for the user,
wherein an identification code is provided for the session, and the session is established if the identification code is not used for an existing session established by the same user on the same server.

29. The computer program product of claim 28, further comprising:
instructions for the server to establish presence information of the user comprising one or more presence attributes related to the client, and
instructions for the server include the identification code in at least one presence attributes related to the client.

30. The computer program product of claim 28, further comprising:
instructions for the server to refuse the session and informing the user a session is not established, if the identification code is used for an existing session of the same user on the server, or if number of existing sessions established by the user on the server has reached a preset limit.

31. The computer program product of claim 28, further comprising:
instructions for the server to include the identification code in an instant message sent by the user from the session, so that a reply to the instant message is delivered to the session, if the session is capable of receiving instant messages.

32. The computer program product of claim 28, further comprising:
instructions for the server to inform all or some of sessions of the user a modification in information related to the user at one of the sessions.

33. The computer program product of claim 32, wherein a modification in information related to the user at one of the sessions is informed to all or some of sessions of the user via a system message.

34. A method, comprising:
receiving, at an instant message and presence service server, a request from a client of a user for establishing a session between the server and the client;
establishing an identification code for the session; and
establishing the session with the client of the user if the identification code is not used by an existing session established by the same user on the server,
wherein said identification code is a code provided by the client or a code generated by the server if the code provided by the client is not unique for the session or the client does not provide the code.

* * * * *

UNITED STATES PATENT AND TRADEMARK OFFICE
CERTIFICATE OF CORRECTION

PATENT NO. : 7,454,781 B2
APPLICATION NO. : 11/270318
DATED : November 8, 2005
INVENTOR(S) : T. Tachizawa et al.

It is certified that error appears in the above-identified patent and that said Letters Patent is hereby corrected as shown below:

In column 11 at line 35 (claim 22, line 5): prior to "processor" please insert --a--.

In column 11 at line 54 (claim 24, line 5): prior to "existing" please insert --an--.

Signed and Sealed this

Twenty-fourth Day of March, 2009

JOHN DOLL
*Acting Director of the United States Patent and Trademark Office*

UNITED STATES PATENT AND TRADEMARK OFFICE
CERTIFICATE OF CORRECTION

PATENT NO.       : 7,454,781 B2
APPLICATION NO.  : 11/270318
DATED            : November 18, 2008
INVENTOR(S)      : T. Tachizawa et al.

It is certified that error appears in the above-identified patent and that said Letters Patent is hereby corrected as shown below:

In column 11 at line 35 (claim 22, line 5): prior to "processor" please insert --a--.

In column 11 at line 54 (claim 24, line 5): prior to "existing" please insert --an--.

This certificate supersedes the Certificate of Correction issued March 24, 2009.

Signed and Sealed this

Fourteenth Day of April, 2009

JOHN DOLL
*Acting Director of the United States Patent and Trademark Office*